United States Patent
McMaster et al.

(10) Patent No.: US 7,295,398 B2
(45) Date of Patent: Nov. 13, 2007

(54) HIGH SPEED CLEANUP OF REMOVABLE STORAGE DEVICE

(75) Inventors: Robert B. McMaster, Farmington, UT (US); Ryan Osterhout, Layton, UT (US)

(73) Assignee: Iomega Corporation, San Diego, CA (US)

( * ) Notice: Subject to any disclaimer, the term of this patent is extended or adjusted under 35 U.S.C. 154(b) by 329 days.

(21) Appl. No.: 11/070,516

(22) Filed: Mar. 2, 2005

(65) Prior Publication Data

US 2006/0198272 A1 Sep. 7, 2006

(51) Int. Cl.
*G11B 23/03* (2006.01)
*G11B 33/14* (2006.01)

(52) U.S. Cl. .................. 360/97.02; 360/133
(58) Field of Classification Search ............. 360/97.02, 360/133
See application file for complete search history.

(56) References Cited

U.S. PATENT DOCUMENTS

| | | | | |
|---|---|---|---|---|
| 5,461,521 | A * | 10/1995 | Ito et al. | 360/75 |
| 6,563,672 | B2 * | 5/2003 | Yamamoto et al. | 360/133 |
| 6,643,097 | B2 * | 11/2003 | Bae et al. | 360/133 |
| 2001/0036039 | A1 * | 11/2001 | Yamamoto et al. | 360/133 |

* cited by examiner

*Primary Examiner*—Jefferson Evans
(74) *Attorney, Agent, or Firm*—Stephen C. Beuerle; Procopio Cory Hargreaves & Savitch LLP

(57) ABSTRACT

A removable data cartridge is protected from air-transported particles such as dust, excessive moisture, contaminants, and the like by filtering or otherwise conditioning the airflow at initial startup. The recording media in the data cartridge is initially spun at a rate of speed higher than the operating speed for a brief period of time. By spinning the media at the increased speed, any particles in the cartridge will be removed by the filters. After the initial cleaning period, the spin speed of the media is reduced to a normal operating level.

4 Claims, 11 Drawing Sheets

HIGH SPEED CLEANUP OF REMOVABLE STORAGE DEVICE

TECHNICAL FIELD

This invention relates to computer storage products, and more particularly to initial cleaning of removable storage cartridges using a high speed startup.

BACKGROUND

A typical disk drive for receiving removable storage cartridges has an actuator that carries read/write heads for communicating with a disk. Linear actuators translate back and forth along a radial axis of the disk. Rotary actuators usually consist of a structural arm that pivots on a voice coil motor and carries read/write heads on a distal end.

When the storage cartridge is not in use, it has a casing surrounding a storage disk which provides protection against dust or contaminants. However when the disk is installed in a drive and accelerated to high speeds for fast access by read/write heads in the drive, an incredible amount of air turbulence is created. Therefore, protection and stabilization of the storage medium on the disk becomes a very serious problem. Some improvements have been obtained by incorporating an inner seal around portions of the periphery of the storage cartridge. See, for example U.S. patent application Ser. No. 09/346,485 entitled A SHUTTERLESS DATA RECORDING CARTRIDGE AND SEAL, which is incorporated herein by reference. See also U.S. Pat. No. 6,466,406 entitled DATA STORAGE CARTRIDGE HAVING ONE OR MORE SURFACE RECESSES FOR IMPROVED INTERNAL AIR CIRCULATION, which is incorporated herein by reference.

Higher storage density on disk storage media has made the prevention and control of dust infiltration a very important factor. Also undesirable particles dislodged or otherwise transported through the air because of the various moving parts within the cartridge and associated drive may abrade and corrupt the storage media or the read/write heads.

U.S. Pat. No. 4,885,652 to Leonard, et al. discloses a generally square disk cartridge for a recording disk includes at least one air filter in a corner of the cartridge and a circular rib adjacent the disk and between the disk and the filter. The cartridge may also include a radial rib connected to the circular rib to enhance air flow to the filter. Air filters may be located in each of the corners of the cartridge with associated circular and radial ribs to induce air flow to each filter.

U.S. Pat. No. 4,969,061 to Patterson et al. discloses a cartridge with a flexible storage disk that rotates against a Bernoulli surface with a passage in communication with a differential pressure region such that air moves through the passage. A filter is positioned in the passage to remove particulate materials from the air.

U.S. Pat. No. 5,615,070 to Bordes discloses a cartridge disk that includes an electrostatic filter in the shell enclosure that is strategically placed to clean the air circulated within the cartridge disk during operation. One part of the filter is placed in an air inlet centrally-mounted in the cover piece of the shell enclosure near a rotation axis of the hard disk platter. A second part of the filter is positioned in an outlet port and sandwiched between the cover piece and the base piece of the shell enclosure.

What is needed is a system that enhances the removal of particulates in a removable data cartridge. Preferably, the system would clean the cartridge quickly on startup to minimize the risk of particulates causing damage during operation.

SUMMARY

A removable data cartridge is protected from air-transported particles such as dust, excessive moisture, contaminants, and the like by filtering or otherwise conditioning the airflow at initial startup. The recording media in the data cartridge is initially spun at a rate of speed higher than the operating speed for a brief period of time. By spinning the media at the increased speed, any particles in the cartridge will be removed by the filters at a faster rate than they would filtered at normal operating speed. After the initial cleaning period, the spin speed of the media is reduced to a normal operating level.

DESCRIPTION OF DRAWINGS

These and other features and advantages of the invention will become more apparent upon reading the following detailed description and upon reference to the accompanying drawings.

DETAILED DESCRIPTION

Figure 1A:
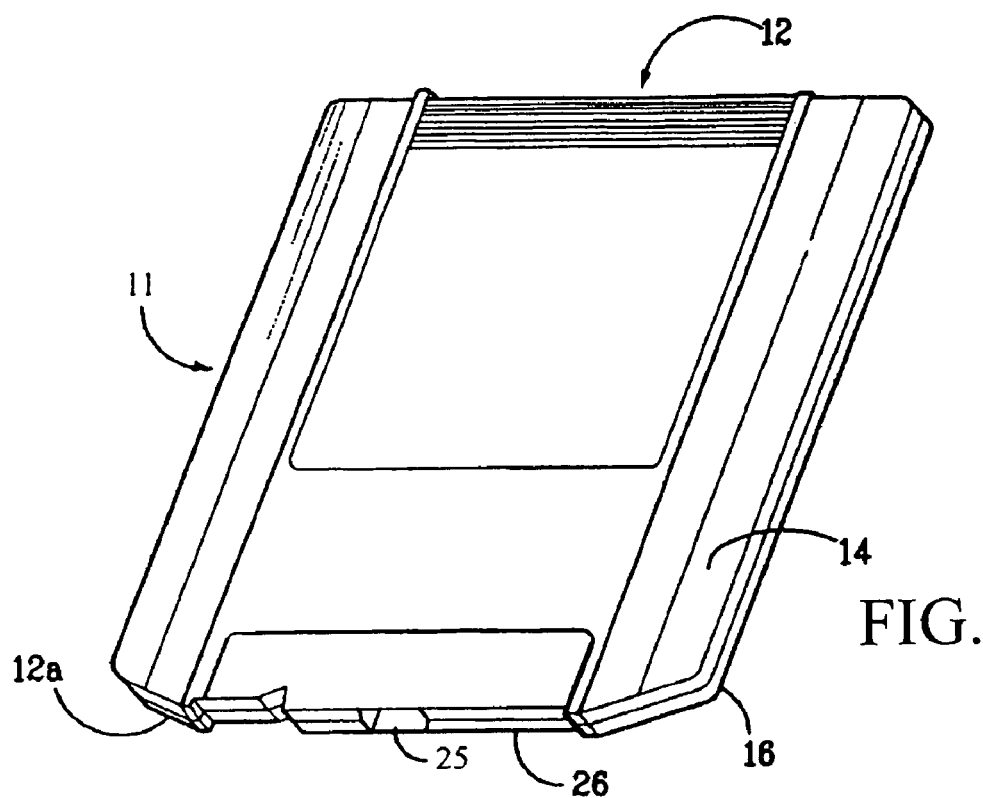
FIG. 1A shows a perspective view of an embodiment of the invention in a removable storage cartridge constructed to receive a linear actuator.
Figure 1B:
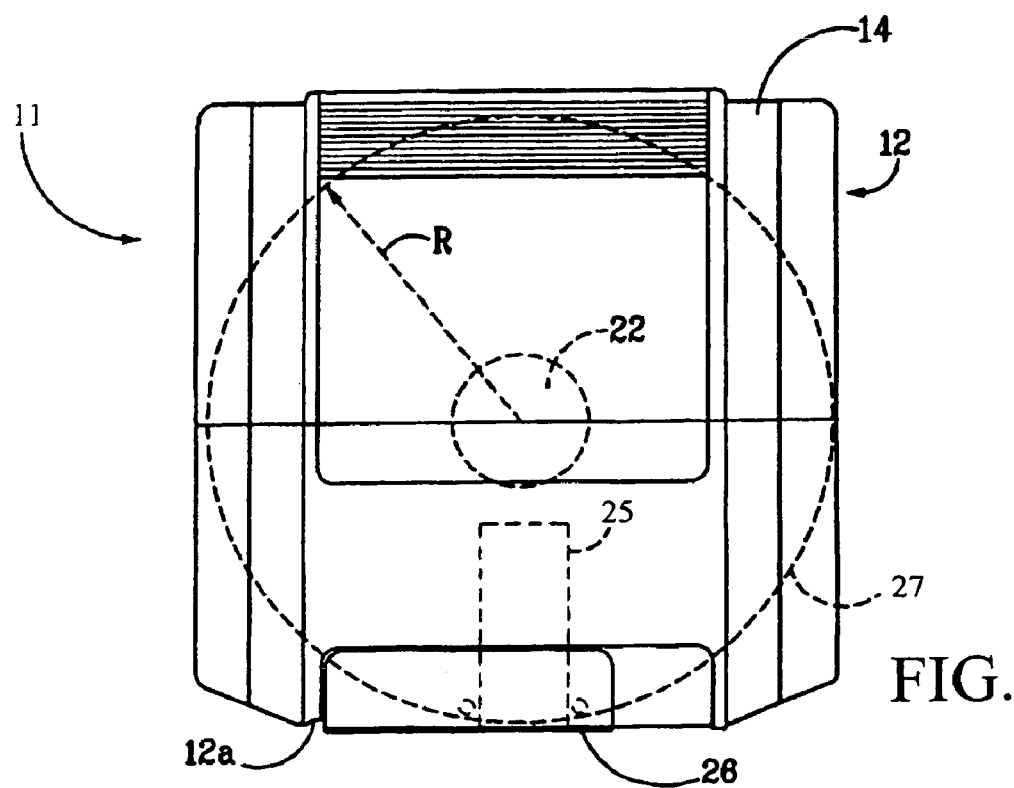
FIG. 1B is a top planar view of the removable storage cartridge of FIG. 1A with certain storage disk components shown in phantom.

Referring to FIGS. 1A and 1B, an exemplary data storage cartridge 11 for incorporating an embodiment of the invention includes an outer shell or housing 12 with an upper half 14 and lower half 16 defining a head access opening 25 for receiving a linear actuator from a disk drive.

A data medium such as storage disk 20 and a hub 22 are rotatably mounted inside the outer shell 12. The head access opening 25 permits read/write heads from the drive to move back and forth along a radius R as the storage disk rotates, and thus be selectively positioned proximate upper and/or lower recording surfaces of the storage disk 20 for read/write accessing from and to the storage medium on the disk. A shutter 26 located along side edge 12a slides away from the head access opening 25 upon insertion of the storage cartridge into a disk drive. Otherwise the shutter is in a normally closed position to protect the storage disk from contaminants or other undesirable interference or contacts.

Figure 2:
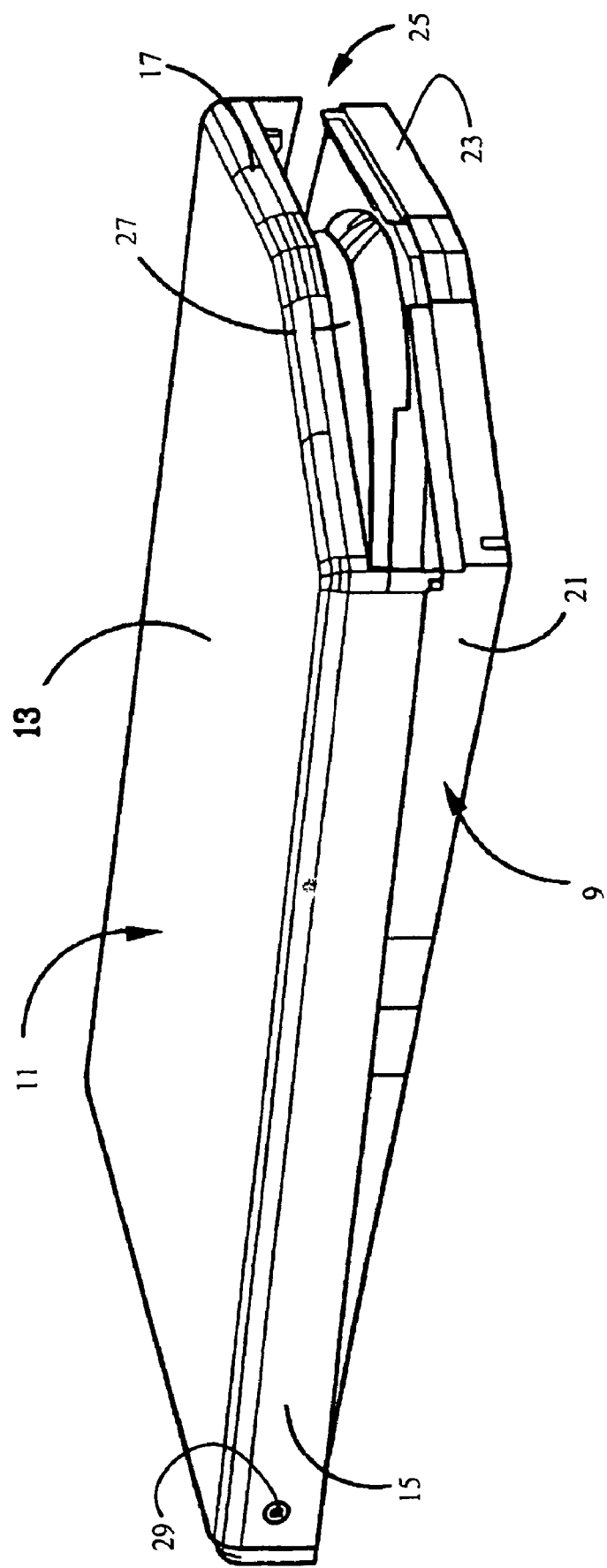
FIG. 2 shows another embodiment of the invention in a removable storage cartridge constructed to receive a rotary actuator.

FIG. 2 illustrates a different embodiment of an exemplary data storage cartridge 11 of the type for receiving a rotary actuator from a disk drive. The storage cartridge including a top shell 13 connected to sidewalls 15 and front wall 17, and including a bottom shell 9 connected to side walls 21 and front wall 23. The top and bottom shells are connected through a rear pivot 29 to form a drive head opening 25 when the shells are in open position for receiving a storage disk 27. (See U.S. Pat. No. 6,268,982, which is incorporated by reference.)

Figure 3:
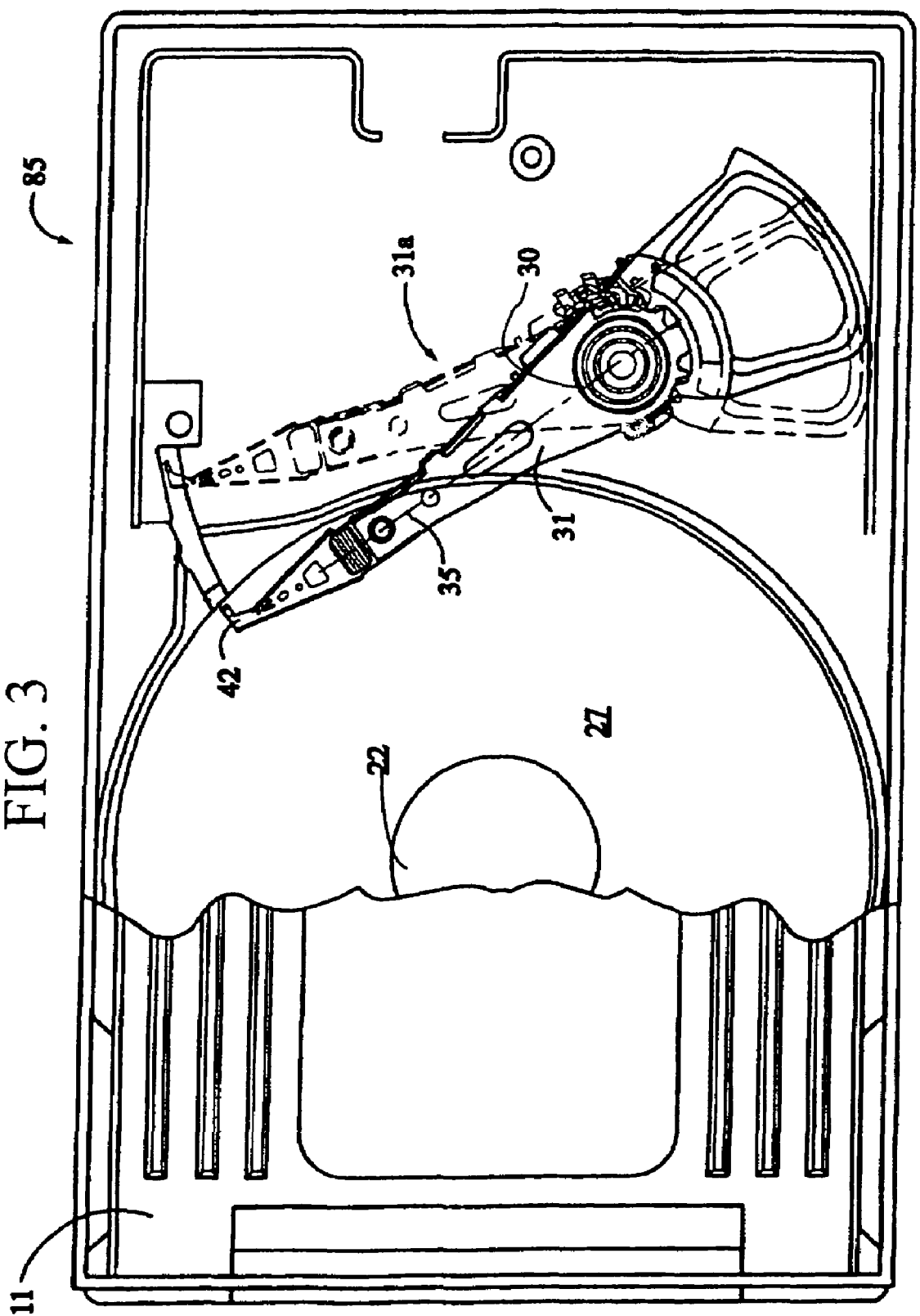
FIG. 3 is an embodiment of the invention showing a partially cutaway view of a drive having a storage disk inserted therein, with a rotary actuator in loaded position and also showing in phantom the rotary actuator in unloaded position.

FIG. 3 shows an exemplary rotary actuator 31 with an actuator arm 35 holding a read/write head 42 in loaded position over a storage disk 27. A loading ramp 80 facilitates the loading and unloading movement of an actuator holding the read/write heads. A voice coil motor 30 enables rotary movement of the actuator to an unloaded position shown in phantom at 31a.

Figure 4:
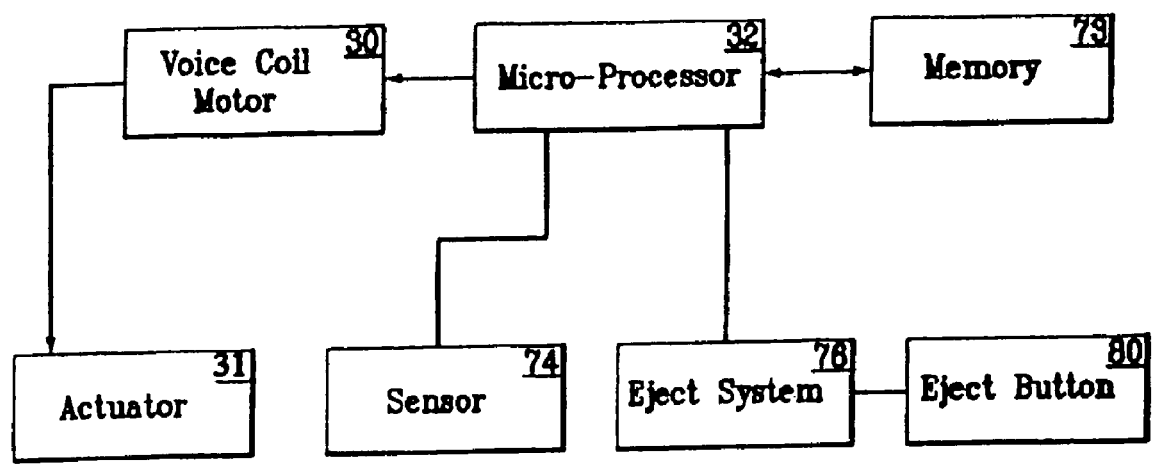
FIG. 4 is a block diagram of the controls for a drive/disk combination employing the features of the invention.

FIG. 4 schematically shows the various operational relationships for moving the actuator of the disk drive between a loaded and unloaded position. More particularly the voice coil motor 30 is coupled to the actuator 31 and is in electrical communication with a microprocessor 32 and a computer programmable memory 73 that has programmed code for controlling the operation of the microprocessor 32.

The disk drive has a mechanical or electrical sensor 74 to detect when a disk cartridge is inserted into the disk drive. An eject system 76 for ejecting the disk cartridge from the disk drive is activated by an eject button 80.

When a disk cartridge is inserted into the disk drive, the sensor detects its presence and communicates this information to the microprocessor. The programmed memory causes the microprocessor to power the voice coil motor so that the actuator is rotated from an unloaded position to a loaded position.

Figure 5:
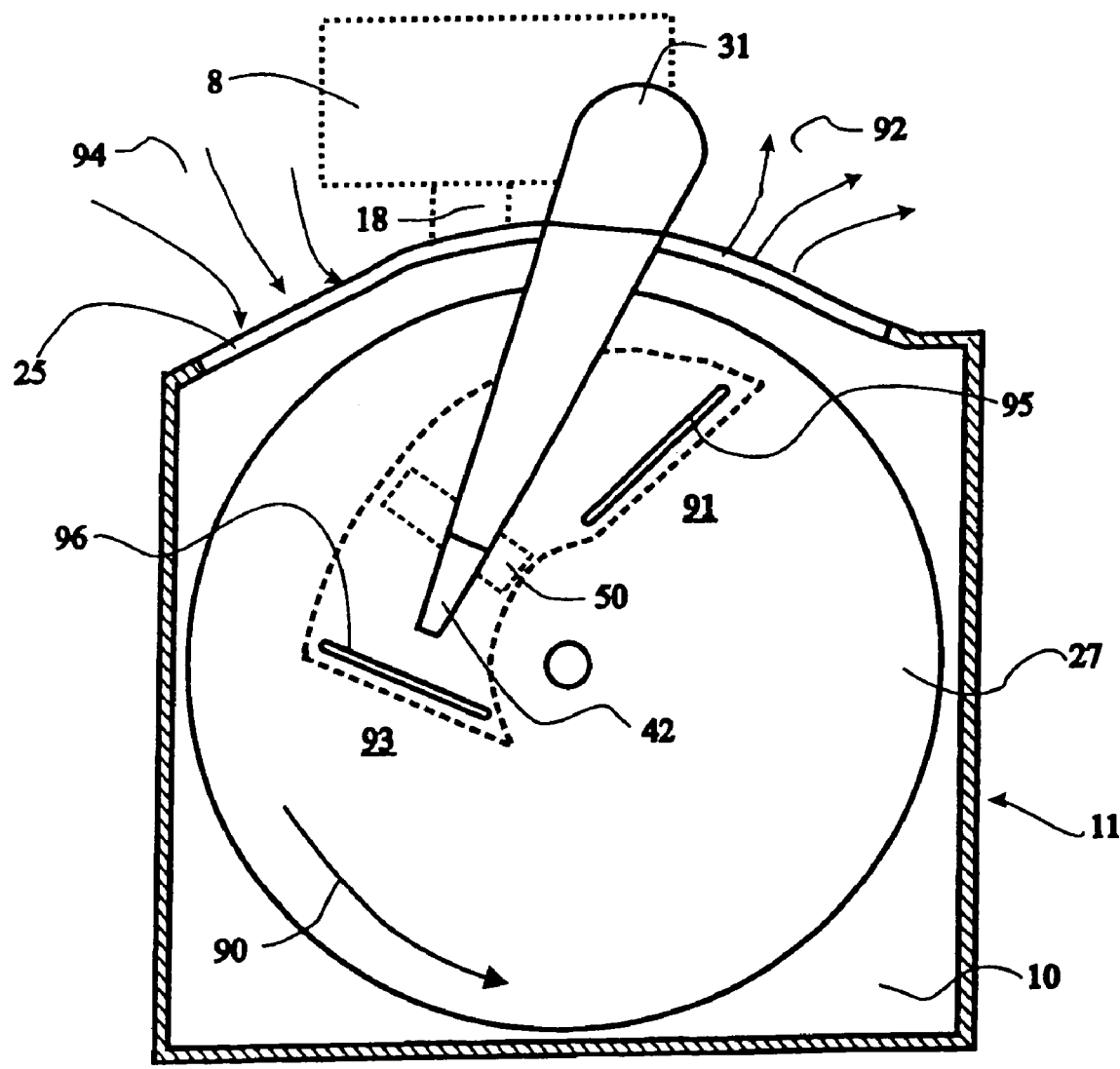
FIG. 5 is a top schematic view showing an embodiment of an airflow unit with an inlet immediately upstream from a read/write actuator.

In FIG. 5, a removable storage cartridge 11 comprises a data storage medium in the form a circular disc 27 housed within a cartridge housing 10. A drive head opening 25 in the housing 10 provides an access path to allow an actuator head to be moved back and forth into proximity with the storage medium 27. The actuator head 42 mounted on an actuator 31 is carried by a disk drive 8.

The storage medium is coupled by any suitable structure (such as through a hub) to a rotator or motor 18 in the drive 8 that rotates the storage medium in the removable cartridge. As the medium is rotated an air flow is created as shown by arrow 90. Due to blockage caused by the actuator head support assembly 31, a high pressure zone 91 is generated upstream of the actuator. Also due to the blockage, the high pressure zone helps to expel air from the cartridge as shown by arrows 92. Similarly actuator blockage creates a low pressure zone 93 downstream from the actuator that induces air inflow as shown by arrows 94. The airflows indicated by 92, 94 are mechanisms for air exchange between the cartridge and the drive and carry possible airborne contaminants.

The present embodiment includes an induction vent 95, preferably located hear a high pressure zone, and an exhaust vent 96 preferably located near a low pressure zone. A conditioning system 50 is disposed in a passage 52 connecting the induction vent 95 and the exhaust vent 96. Air enters the induction vent 95 passes through the conditioning system 50 and is reprocessed and reconditioned. The reprocessed and reconditioned air is re-introduced at the exhaust slot vent 96. The air conditioning system 50 may include any suitable air conditioning, filtration, processing system, or the like.

Figure 6A:
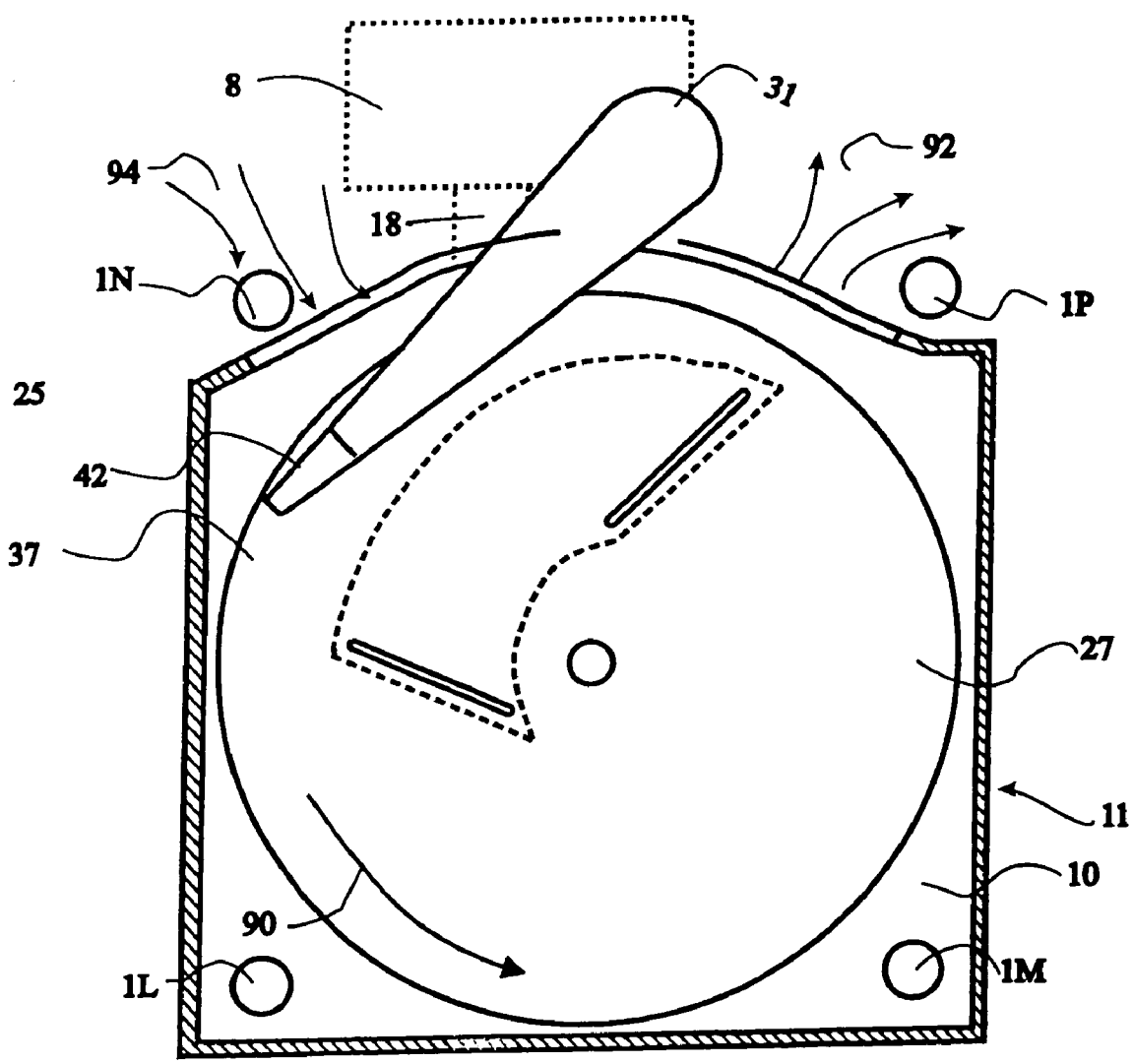
FIGS. 6A and 6B is a top schematic view showing another embodiment with a plurality of airflow units located in selected positions outside of the perimeter of a rotating storage disk.
Figure 6B:
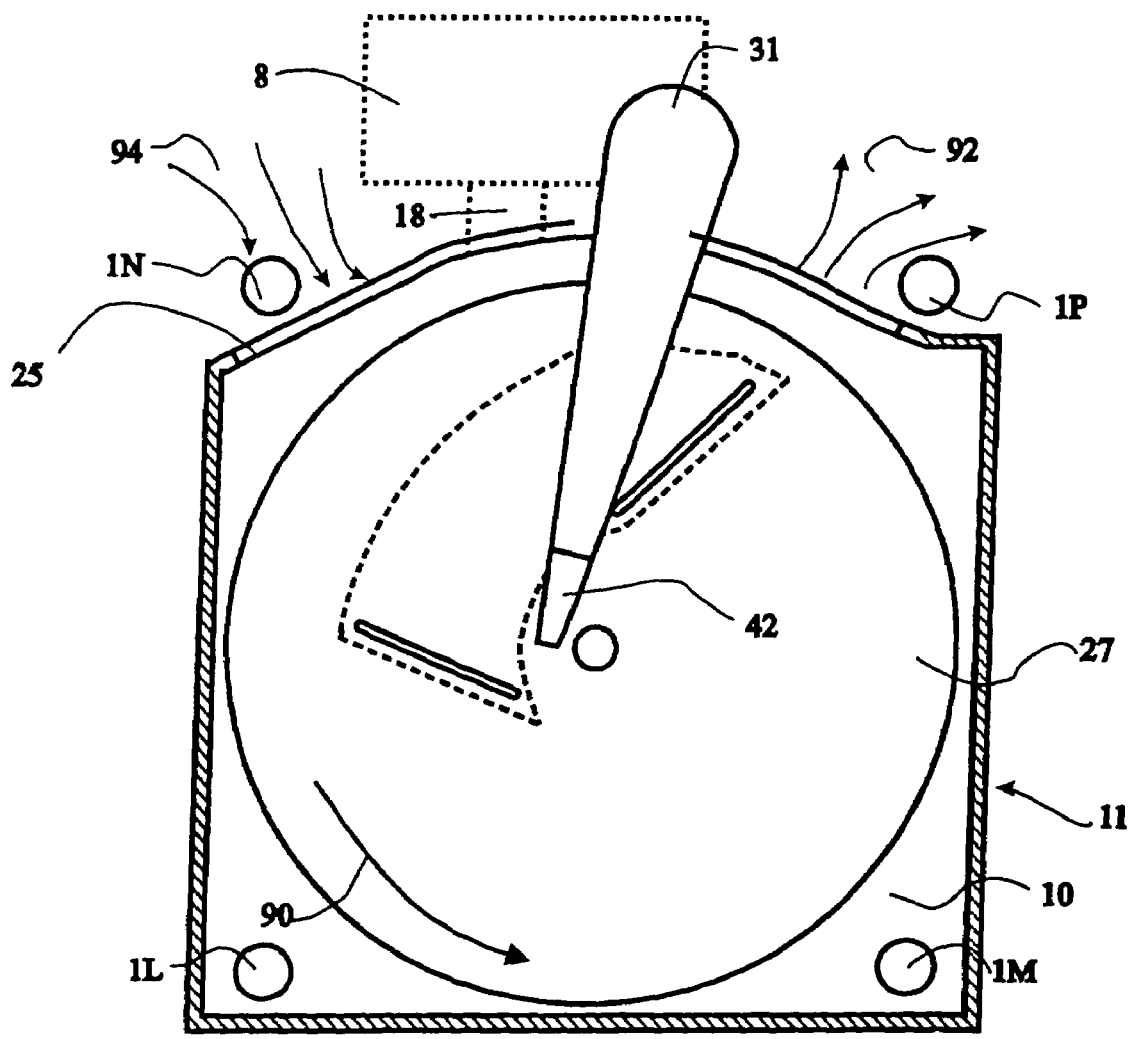

In FIGS. 6A and 6B, a removable storage cartridge 11 comprises a data storage medium in the form of a circular disc 27 housed within a cartridge housing 10. A drive head opening 25 in the housing provides an access path to allow an actuator head to be moved back and forth into proximity with the storage medium 27. The actuator head 42 is mounted on an actuator 31 that is carried by a disk drive 8.

The storage medium is coupled by any suitable structure to a rotator or motor 18 in the drive 8 to rotate the storage medium in the removable cartridge. As the medium is rotated an air flow is created as shown by arrow 90.

Referring to FIG. 6A, when the actuator is near an outer periphery 37 of the disk, the wake from the flow over the actuator results in dynamic pressure loss in the flow downstream of the actuator and produces a hydrodynamic blockage in a first recirculation filter unit at location 1L. However, a second recirculation filter or air-conditioning unit at location 1M is not in the wake for this perimeter actuator position and is still effective.

Referring to FIG. 6B, when the actuator is near a center portion 36 of the disk, the wake from the flow over the actuator results in dynamic pressure loss in the flow downstream of the actuator and produces a hydrodynamic blockage in the second recirculation filter unit at 1M. However, the first unit at location 1L is not in the wake for the center portion head position and is still effective. Consequently when the filter at location 1L is ineffective, the filter at location 1M is effective and vice-versa. The effectiveness of the filtration system is therefore less sensitive to actuator position by using such plurality of filter units uniquely located.

A similar scheme applies at the drive level as well. When the actuator is near the center, airflows in and out of the cartridge are set up as shown at locations 1N and 1P, for first and second filters, respectively. The flow direction at 1N and 1P is dependent on actuator position on the disk, so drive level filters can complement each other at locations 1N and 1P for different actuator position similar to the previously described filter unit positions.

Figure 7:
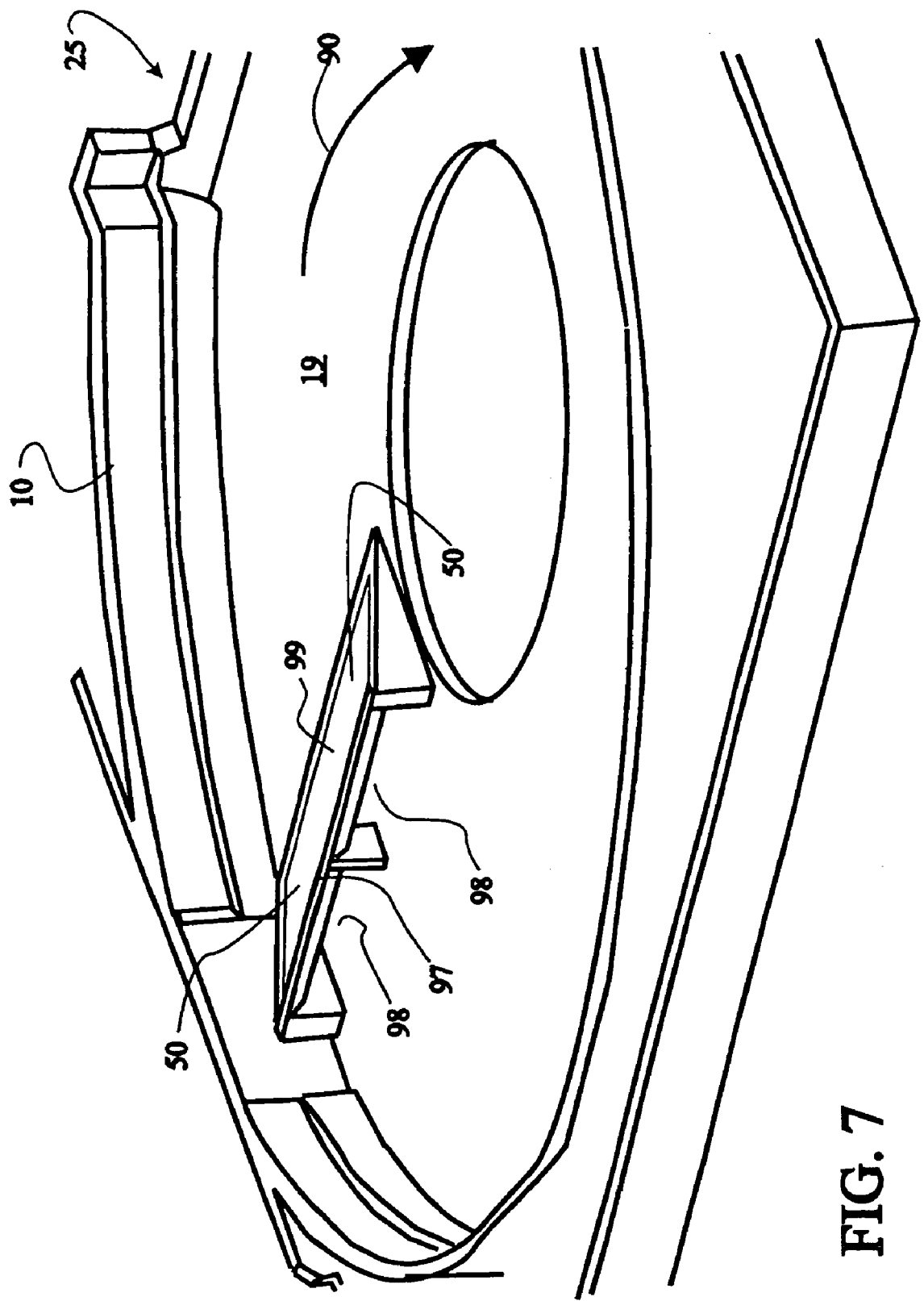
FIG. 7 is a cutaway perspective view showing a different version of an airflow unit displaced from a head access hole in the cartridge.
Figure 8:
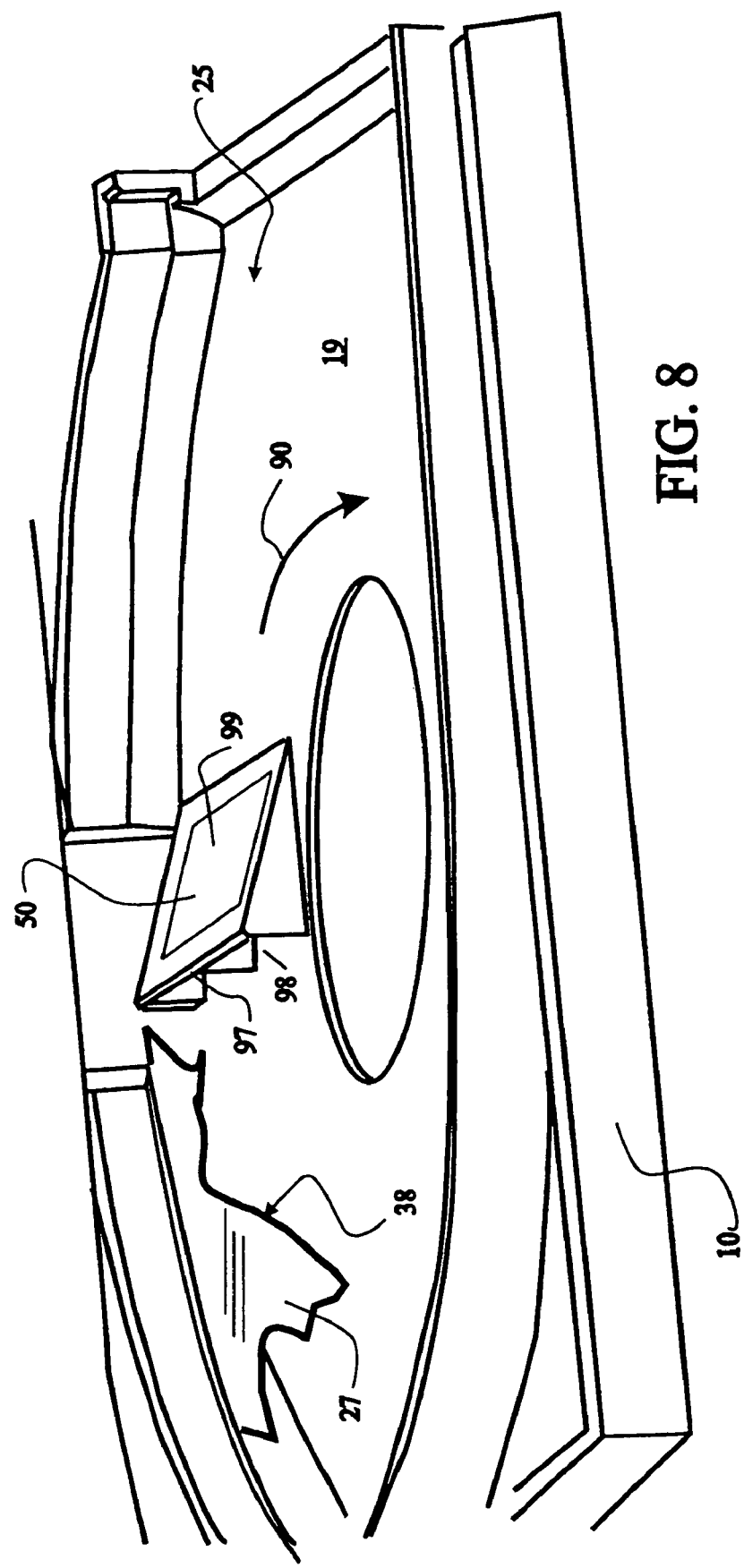
FIG. 8 shows the structure of FIG. 7 from a side perspective view.
Figure 9:
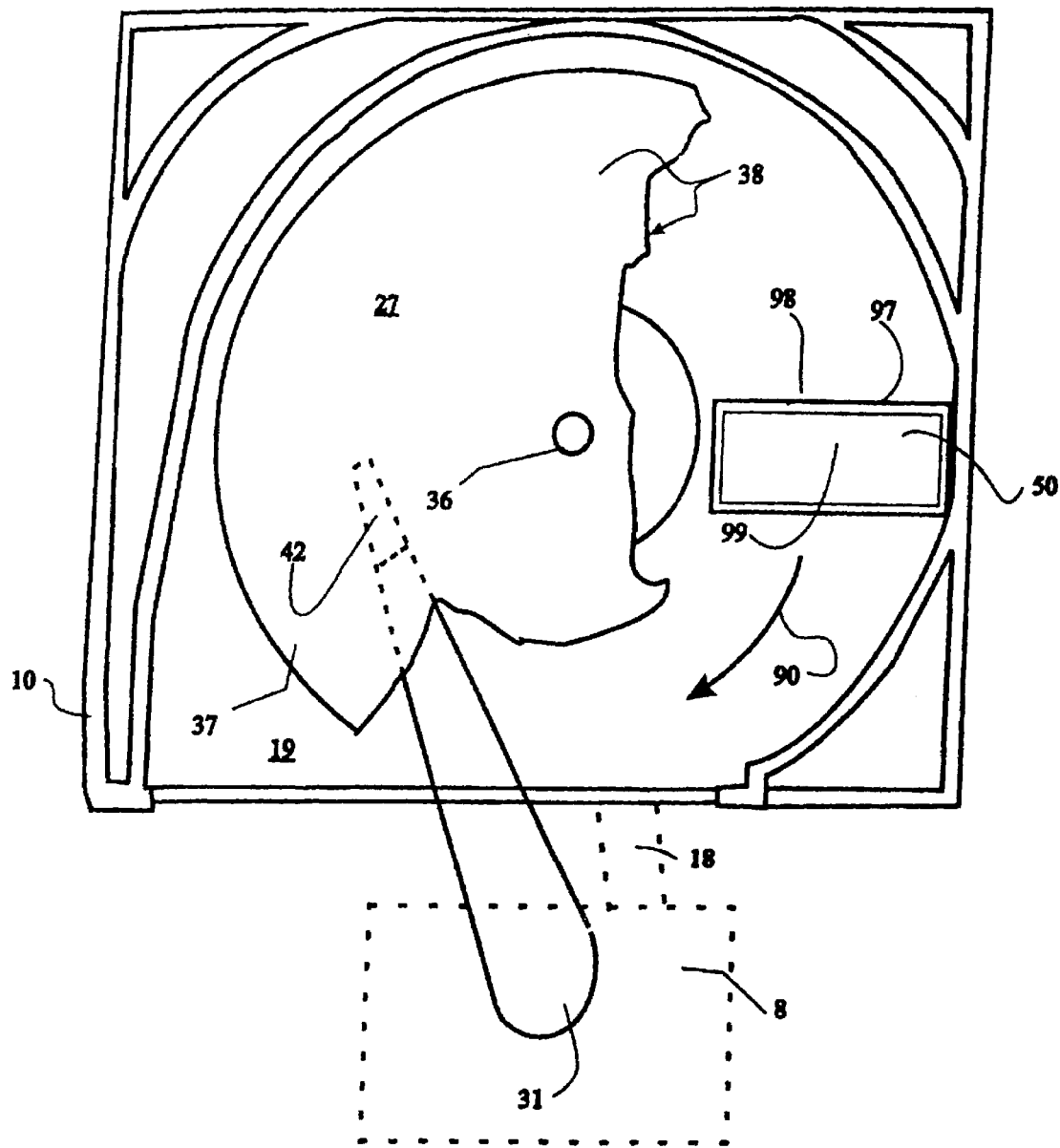
FIG. 9 is a top view of the structure of FIG. 7.

Reference is now made to FIGS. 7, 8 and 9. Shown is only a portion of a cartridge of the invention. In this embodiment, a filter or air conditioning unit with an enlarged inlet 98, and an upwardly oriented filter outlet 99 is mounted in a cartridge that has a housing 10 with a head access opening 25.

Figure 10:
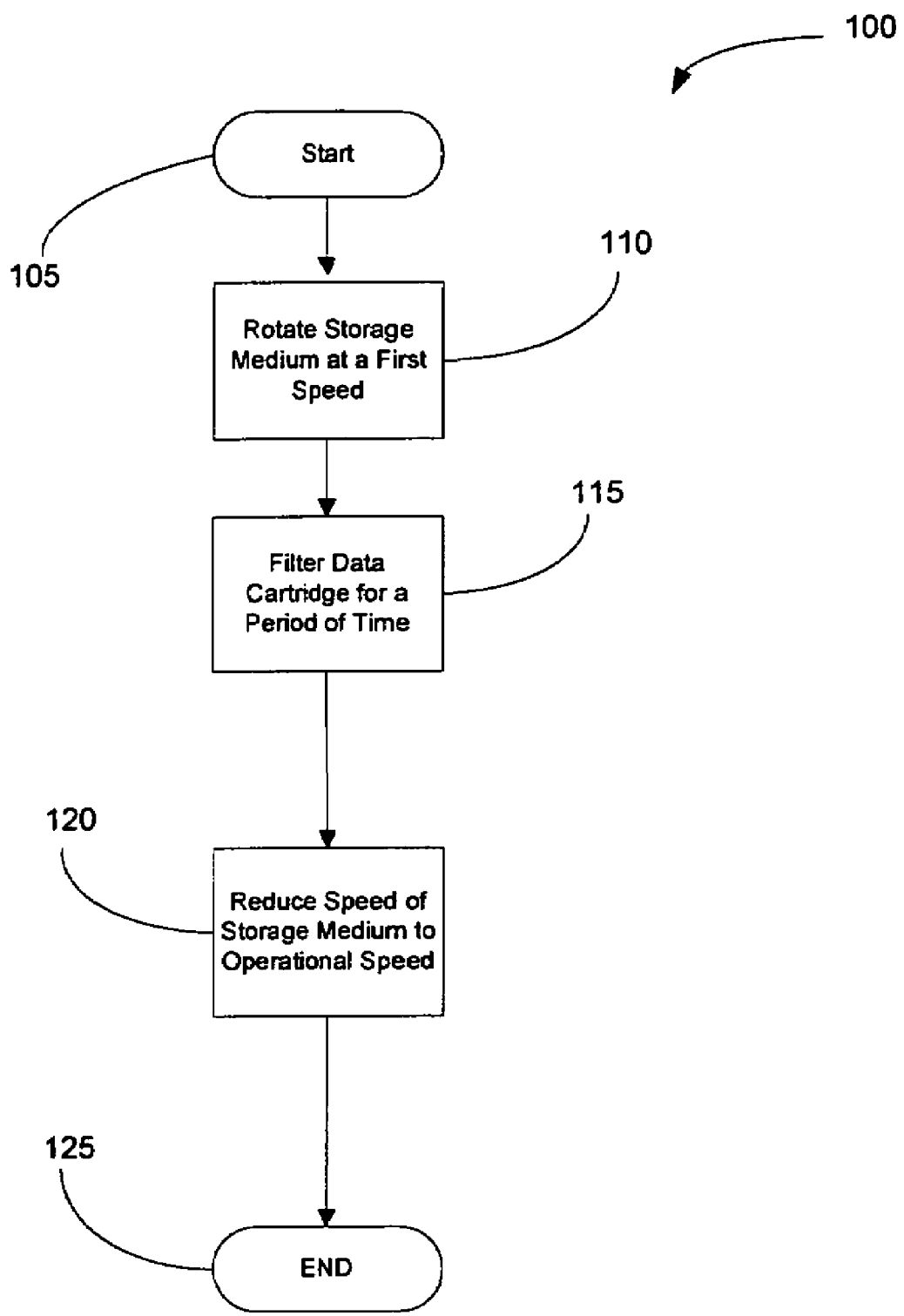
FIG. 10 is a flowchart showing the process for increasing particulate removal at startup.

The cartridge has a circular storage medium 27 (shown in part in FIG. 9 and FIG. 10) with a center 36, a periphery 37, and a data storage surface 38. The medium 27 may have a storage surface on both sides 38. The storage medium 27 is protected within the housing 10. Referring in particular to FIG. 10, the housing 10 is structured to provide an access path through access opening 25 to allow the head 42 of the actuator 31 to be moved back and forth into proximity with the data storage surface 38 of the medium. The storage medium 27 is rotated by a drive rotator or motor 18 around the center 36 when the removable cartridge is mounted in the drive.

The housing 10 includes a panel 19 that is generally parallel to and extending over the storage medium 27. Rotation of the storage medium induces an air flow in the direction of rotation 90 over the data storage surface of the medium. An air processing or conditioning unit 50 is located across the air flow in at least part of the region between the center 36 and the periphery 37 of the rotating medium 27 and between the data storage surface 38 of the medium 27 and the panel 19. Only one panel 19 and conditioning unit 50 is shown, but there may a panel and conditioning unit associated with the other data storage surface 38. Preferably, the air processing unit is directed over most of this region with where the air processing unit extends between a location near the center and a location adjacent the periphery of the rotating medium and extends between a location adjacent to the data storage surface of the medium and a location adjacent to the panel.

To increase the particle capturing surface of the filter and minimize the tendency of particle laden air to flow around the conditioning unit, the air processing unit is preferably angled, preferably with a leading edge 97 directed in a direction into the air flow at the location adjacent the surface of the medium.

In any embodiment of the invention, variously shaped and sized airflow conditioning units can be incorporated for use with variously sizes and shapes of storage disks installed in different orientations with a disk drive in order to enjoy the benefits of the invention. It is believed that the direction control of air passing through the airflow units helps to diminish the air exchange from outside the cartridge. In this regard, structures in air flow path, such as induction and exit vents, flow passages, cartridge and drive walls, may include aerodynamic contours to help handle and direct air currents efficiently. Any of the aspects or embodiments of the invention can be used alone or used with other aspects or embodiments of the invention or other air conditioning/filtering systems for more effective air conditioning and filtering.

FIG. 10 illustrates a process 100 for cleaning the data storage cartridge 11 according to the present invention. The process 100 begins at a START block 105. Proceeding to block 110, the process 100 spins the storage medium 27 at a first speed. This first speed is a higher speed than the normal operating speed of the data storage cartridge 11. For example, if the normal operating speed of the data storage cartridge 11 is 4200 rpm, the first speed may be 5000 rpm, or any other speed greater than 4200 rpm.

Proceeding to block 115, the process 100 maintains the storage medium 27 spinning at the first speed for a set period of time. During this time period, the increased speed of the storage medium 27 increases the pressure differential across the filter to improve the removal of the particulates.

After the designated time period, the process 100 proceeds to block 120 where the speed of the storage medium 27 is reduced to the normal operating speed. At this point, the high speed cleanup will have significantly reduced the amount of particulates in the data storage cartridge 11, thereby increasing the reliability of the cartridge. The process 100 then terminates in END block 125.

The process 100 can be run anytime the cartridge needs to be cleaned, and would typically be set to run each time the cartridge is inserted into the drive. Thus, the cartridge will be automatically cleaned using the dual-speed process at startup.

Numerous variations and modifications of the invention will become readily apparent to those skilled in the art. Accordingly, the invention may be embodied in other specific forms without departing from its spirit or essential characteristics.

What is claimed is:

1. A method for removing particulates in particle laden air flow in a removable data storage cartridge, comprising:
    rotating a storage medium at a first speed, wherein the first speed is higher than an operational speed of the storage medium;
    while rotating the storage medium at the first, higher speed, filtering out particulates in particle laden air flow at a faster rate compared to filtering at an operational speed of the storage medium, the filtering being performed with one or more air processing units in the air flow without the one or more air processing units contacting the rotating storage medium; and
    reducing the speed of the storage medium to a second speed, wherein the second speed is the operational speed of the storage medium.

2. The method of claim 1, wherein the rotation of the storage medium induces the air flow over and beyond the rotating medium.

3. The method of claim 1, further comprising rotating the storage medium at the first speed for a predetermined period of time.

4. The method of claim 1, further comprising rotating the storage medium at the first speed upon insertion of the removable data storage cartridge into a drive.

* * * * *